(12) United States Patent
Lin et al.

(10) Patent No.: US 8,824,888 B2
(45) Date of Patent: Sep. 2, 2014

(54) METHOD FOR NEGOTIATING LINK CAPABILITY INFORMATION, NETWORK DEVICE, AND COMMUNICATION SYSTEM

(75) Inventors: Yi Lin, Shenzhen (CN); Xiaobing Zi, Shenzhen (CN); Qiuyou Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 205 days.

(21) Appl. No.: 13/405,054

(22) Filed: Feb. 24, 2012

(65) Prior Publication Data

US 2012/0155874 A1  Jun. 21, 2012

Related U.S. Application Data

(63) Continuation of application No. PCT/CN2010/076342, filed on Aug. 25, 2010.

(30) Foreign Application Priority Data

Aug. 28, 2009 (CN) .......................... 2009 1 0171733

(51) Int. Cl.
*H04B 10/20* (2006.01)
*H04J 3/12* (2006.01)
*H04J 3/16* (2006.01)

(52) U.S. Cl.
CPC ................. *H04J 3/1652* (2013.01); *H04J 3/12* (2013.01); *H04J 2203/0058* (2013.01)
USPC .................... 398/58; 398/79; 398/45; 398/66; 398/67; 398/98; 398/75; 398/100; 398/48; 370/474; 370/476; 370/498; 370/389; 370/392

(58) Field of Classification Search
USPC ......... 398/58, 79, 98, 99, 100, 66, 67, 68, 70, 398/71, 72, 75, 154, 155, 140, 141, 52, 182, 398/183, 202, 135, 136, 137, 138, 139, 208, 398/214, 158, 159, 59, 60, 45, 48; 370/474, 370/476, 535, 537, 538, 539, 498, 466, 389, 370/395.51
See application file for complete search history.

(56) References Cited

U.S. PATENT DOCUMENTS 7,844,181 B2 *  11/2010  Natarajan et al. ............... 398/79
2004/0073717 A1 *  4/2004  Cline et al. .................... 709/250
(Continued)

FOREIGN PATENT DOCUMENTS

| CN | 1627754 A | 6/2005 |
| CN | 1726687 A | 1/2006 |
| CN | 1790993 A | 6/2006 |
| CN | 101060420 A | 10/2007 |
| CN | 101388881 A | 3/2009 |

OTHER PUBLICATIONS

Partial translation of Office Action dated Nov. 20, 2012 in connection with Chinese Patent Application No. 2009101771733.0.

(Continued)

*Primary Examiner* — Hanh Phan (57) ABSTRACT

The present invention relates to a method for negotiating link capability information. The method includes: After a higher order optical channel data unit (ODU) link is established, a second node receives first higher order ODU link capability information supported by a first node at one end of the link, where the second node is located at the other end of the link; determines link capability information according to the first higher order ODU link capability information and second higher order ODU link capability information that is supported by the second node; and sends the link capability information to the first node; or sends the second higher order ODU link capability information to the first node, so that the first node determines the link capability information according to the first higher order ODU link capability information and the second higher order ODU link capability information.

6 Claims, 7 Drawing Sheets

(56) References Cited

U.S. PATENT DOCUMENTS

2006/0104309 A1\* 5/2006 Vissers et al. .................. 370/474
2007/0071443 A1 3/2007 Fukumitsu et al.
2007/0248121 A1\* 10/2007 Zou ............................... 370/498

OTHER PUBLICATIONS

International Search Report dated Dec. 2, 2010 in connection with International Patent Application No. PCT/CN2010/076342.

Fatai Zhang, et al., "Link Management Protocol (LMP) extensions for G.709 Optical Transport Networks", draft-zhang-ccamp-gmpls-g709-lmp-discovery-00.txt, Sep. 19, 2009, 15 pages.

Extended European Search Report dated Oct. 11, 2012 in connection with European Patent Application No. 10811267.3, 6 pages.

Written Opinion of the International Searching Authority dated Dec. 2, 2010 in connection with International Patent Application No. PCT/CN2010/076342.

J. Lang, "Link Management Protocol (LMP)", Network Working Group, Oct. 2005, 86 pages.

\* cited by examiner

METHOD FOR NEGOTIATING LINK CAPABILITY INFORMATION, NETWORK DEVICE, AND COMMUNICATION SYSTEM

CROSS-REFERENCE TO RELATED APPLICATIONS

This application is a continuation of International Application No. PCT/CN2010/076342, filed on Aug. 25, 2010, which claims priority to Chinese Patent Application No. 200910171733.0, filed on Aug. 28, 2009, both of which are hereby incorporated by reference in their entireties.

TECHNICAL FIELD

The present invention relates to communication technologies, and in particular, to a method for negotiating link capability information of a higher order optical channel data unit, a network device, and a communication system.

BACKGROUND

An optical transport network (Optical Transport Network, referred to as an OTN) is a transparent transport technology developed and formed to meet scheduling requirements of large capacity and coarse granularity on a backbone network layer. Signal types supported by the OTN become more and more abundant with continuous release of different versions of OTN standards. An old OTN standard (ITU-T G.709 Amendment1) defines three signal types: ODU1, ODU2, and ODU3, where bandwidths of the ODU1, ODU2, and ODU3 are 2.5 Gbit/s, 10 Gbit/s, and 40 Gbit/s respectively, and a tributary slot type supported by the ODU1, ODU2, and ODU3 is 2.5 Gbit/s. On the basis of the old OTN standard, an ODU1, ODU2, and ODU3 defined in a new OTN standard (ITU-T G.709 Amendment3 and G. sup43) also support a tributary slot type of 1.25 Gbit/s. In addition, the new OTN standard further proposes a new signal type that supports the tributary slot type of 1.25 Gbit/s, such as ODU0, ODU2e, ODU3e2, ODU4, and ODUflex with a variable bandwidth, and a new signal type ODU3e1 that supports the tributary slot type of 2.5 Gbit/s.

If an ODUj and ODUk are used to represent two signal types respectively, when the ODUj may be multiplexed to the ODUk and uses a tributary slot of the ODUk to transmit a signal, the ODUj is called a lower order ODU (Lower Order ODU, referred to as an LO ODU) and the ODUk is called a higher order ODU (Higher Order ODU, referred to as an HO ODU). For example, in the old OTN standard, the ODU1 may be multiplexed to the ODU2 and uses a tributary slot of the ODU2, where the type of the tributary slot is 2.5 Gbit/s, the ODU2 is a higher order ODU and the ODU1 is a lower order ODU. As compared with the old OTN standard, a higher order ODU of the same type in the new OTN standard supports more types of lower order ODUs and is compatible with the two tributary slot types, namely 2.5 Gbit/s and 1.25 Gbit/s. For example, when a higher order ODU is the ODU2, the ODU supports multiplexing of lower order ODUs such as ODU0, ODU1 and ODUflex; when a lower order ODU is the ODU1, the ODU2 supports signal transmission of the ODU1 in the two tributary slot types 2.5 Gbit/s and 1.25 Gbit/s.

An existing network has been deployed with an old device that complies with the old OTN standard and a new device that complies with the new OTN standard. Higher order ODU link capability of the old device is different from higher order ODU link capability of the new device. The new device is compatible with the higher order ODU link capability supported by the old device. However, ODU link capability supported by new devices of different types may vary. The old device does not support the newly-added higher order ODU link capability of the new device. After a higher order ODU link is established, in order to enable the higher order ODU link to be correctly used, nodes on the two ends of the higher order ODU link need to acquire the link capability. In the prior art, generally capability information of the higher order ODU link is manually configured on the nodes at the two ends of the higher order ODU link, so that the nodes use the higher order ODU link based on the link capability. The number of higher order ODU links on the network is very large. Therefore, a workload of manual configuration is heavy and efficiency is low.

SUMMARY

Embodiments of the present invention provide a method for negotiating link capability information, a network device, and a communication system, which are used to improve efficiency of negotiating higher order ODU link capability information.

An embodiment of the present invention provides a method for negotiating link capability information. After a higher order optical channel data unit (ODU) link is established, the method includes:

receiving, by a second node, first higher order ODU link capability information supported by a first node at one end of the link, where the second node is located at the other end of the link;

determining link capability information according to the first higher order ODU link capability information and second higher order ODU link capability information that is supported by the second node; and sending the link capability information to the first node; or sending the second higher order ODU link capability information to the first node, so that the first node determines the link capability information according to the first higher order ODU link capability information and the second higher order ODU link capability information.

An embodiment of the present invention further provides another method for negotiating link capability information. After a higher order optical channel data unit (ODU) link is established, the method includes:

sending, by a first node on one end of the link, first higher order ODU link capability information supported by the first node to a second node at the other end of the link, so that the second node determines link capability information according to the first higher order ODU link capability information and second higher order ODU link capability information that is supported by the second node; and receiving the link capability information sent by the second node.

An embodiment of the present invention further provides a network device. The device includes:

a module for receiving capability information about the other end, configured to, after a higher order optical channel data unit (ODU) link is established, receive first higher order ODU link capability information supported by a first node at the other end of the link;

a link capability information determining module, configured to determine link capability information according to the first higher order ODU link capability information and second higher order ODU link capability information that is supported by the link capability information determining module; and a capability information sending module, configured to send the link capability information to the first node, or send the second higher order ODU link capability information to the first node, so that the first node determines the link capability information according to the first higher order ODU link capability information and the second higher order ODU link capability information.

An embodiment of the present invention further provides another network device. The device includes:

a local-end capability information sending module, configured to send first higher order ODU link capability information supported by the local-end capability information sending module to a second node at the other end of the link, so that the second node determines link capability information according to the first higher order ODU link capability information and second higher order ODU link capability information that is supported by the second node; and a link capability information determining module, configured to receive the link capability information sent by the second node.

An embodiment of the present invention further provides a communication system. The system includes: a higher order optical channel data unit (ODU) link, and a first node and a second node that are located at the two ends of the higher order ODU link.

The first node is configured to send first higher order ODU link capability information supported by the first node to the second node.

The second node is configured to determine link capability information according to second higher order ODU link capability information supported by the second node and the first higher order ODU link capability information; and send the link capability information to the first node.

An embodiment of the present invention further provides another communication system. The system includes: a higher order optical channel data unit (ODU) link, and a first node and a second node that are located at the two ends of the higher order ODU link.

The first node is configured to send first higher order ODU link capability information supported by the first node to the second node; receive second higher order ODU link capability information supported by the second node; and determine link capability information according to the first higher order ODU link capability information and the second higher order ODU link capability information.

The second node is configured to send the second higher order ODU link capability information to the first node; receive the first higher order ODU link capability information; and determine the link capability information according to the first higher order ODU link capability information and the second higher order ODU link capability information.

According to the method for negotiating the link capability information, the network device, and the communication system that are provided in the embodiments of the present invention, automatic negotiation is performed based on the higher order ODU link capability information supported by the two nodes at the two ends of the higher order ODU link, which reduces manual operations during the process of negotiating the higher order ODU link capability information and reduces a workload of maintenance personnel for configuring nodes of the higher order ODU link, so that efficiency of negotiating the higher order ODU link capability information is improved.

BRIEF DESCRIPTION OF THE DRAWINGS

To make the technical solutions provided in the embodiments of the present invention or the prior art clearer, accompanying drawings for illustrating the embodiments or the prior art are briefly described below. Apparently, the accompanying drawings in the following description are only some embodiments of the present invention, and persons of ordinary skill in the art may further obtain other drawings from these accompanying drawings without creative efforts.

DETAILED DESCRIPTION

The technical solutions according to the embodiments of the present invention are described below with reference to the accompanying drawings in the embodiments of the present invention. Evidently, the embodiments to be described are only part of rather than all of the embodiments of the present invention. All other embodiments obtained by persons of ordinary skill in the art based on the embodiments of the present invention without making creative efforts shall fall within the protection scope of the present invention.

Figure 1:
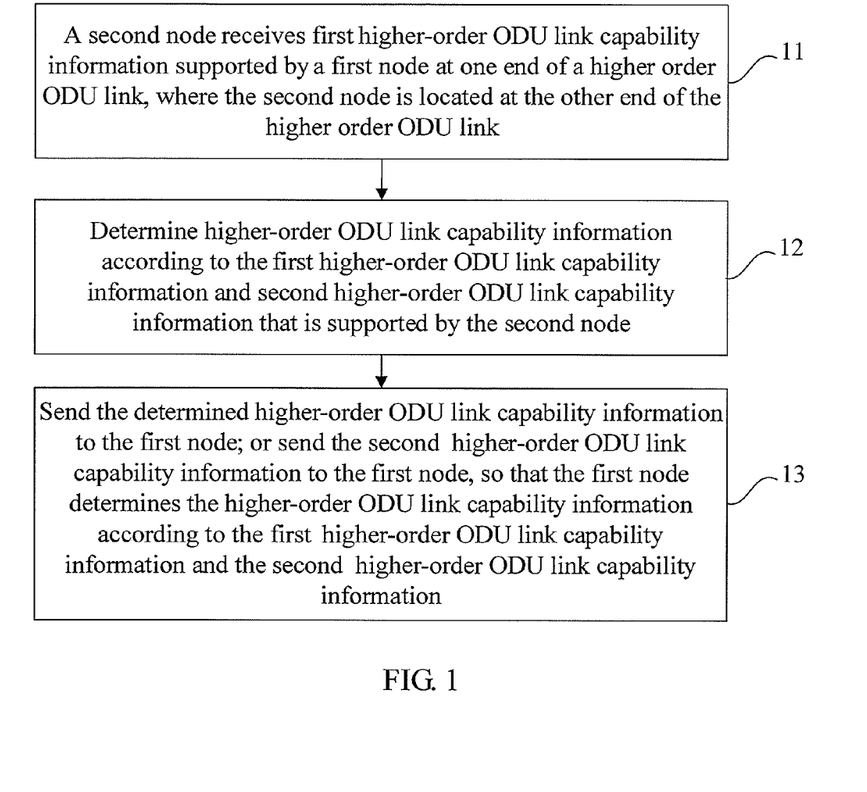
FIG. 1 is a schematic flowchart of a method for negotiating link capability information according to a first embodiment of the present invention.

FIG. 1 is a schematic flowchart of a method for negotiating link capability information according to a first embodiment of the present invention. An application scenario of this embodiment is that: After a higher order ODU link is established between any two nodes on an OTN, higher order ODU link capability is negotiated between the two nodes at the two ends of the higher order ODU link. An executing subject of the method for negotiating link capability information according to this embodiment may be any node at the two ends of the higher order ODU link. For ease of description, in the embodiment of the present invention, a node located at one end of the higher order ODU link is called a first node, and a node located at the other end of the higher order ODU link is called a second node. This embodiment uses the second node as the executing subject. As shown in FIG. 1, the method for negotiating link capability information according to this embodiment includes:

Step 11: A second node receives first higher order ODU link capability information supported by a first node at one end of a higher order ODU link, where the second node is located at the other end of the higher order ODU link.

The first higher order ODU link capability information supported by the first node may include: a lower order ODU type (referred to as a first lower order ODU type) and a tributary slot type (referred to as a first tributary slot type) which are supported by the first node when multiplexing is performed.

The tributary slot type according to the embodiment of the present invention may include types with tributary slot granularity of 2.5 Gbit/s or 1.25 Gbit/s. If a node supports a tributary slot type with smaller tributary slot granularity, for example, 1.25 Gbit/s, the node is compatible with a tributary slot type with larger tributary slot granularity, for example, 2.5 Gbit/s.

Step 12: Determine higher order ODU link capability information according to the first higher order ODU link capability information and second higher order ODU link capability information that is supported by the second node.

The second higher order ODU link capability information supported by the second node includes a lower order ODU type (referred to as a second lower order ODU type) and a tributary slot type (referred to as a second tributary slot type) which are supported by the second node when multiplexing is performed.

The second node, after obtaining the first higher order ODU link capability information supported by the first node, determines the link capability information by taking ODU link capability information supported by the two nodes into consideration comprehensively. When the link capability information is determined, the ODU link capability information supported by the two nodes may be determined as the ODU link capability information. Specifically, an intersection of the lower order ODU types respectively supported by the two nodes may be determined as a lower order ODU type supported by the ODU link; and when tributary slot granularity of tributary slot types supported by the two nodes is equal, any of the tributary slot types supported by the two nodes is determined as a tributary slot type supported by the ODU link, or when tributary slot granularity of tributary slot types supported by the two nodes is not equal, a tributary slot type with greater tributary slot granularity is determined as a tributary slot type supported by the ODU link. The determining, when tributary slot granularity of tributary slot types supported by the two nodes is equal, any of the tributary slot types supported by the two nodes as a tributary slot type supported by the ODU link, or the determining, when tributary slot granularity of tributary slot types supported by the two nodes is not equal, a tributary slot type with greater tributary slot granularity as a tributary slot type supported by the ODU link may specifically be: when the tributary slot granularity of the tributary slot type supported by the first node is equal to the tributary slot granularity of the tributary slot type supported by the second node, it indicates that the tributary slot types supported by the two node are the same, and when the tributary slot granularity is equal, the tributary slot type is used as the tributary slot type supported by the ODU link; when the tributary slot granularity of the tributary slot type supported by the first node is not equal to the tributary slot granularity of the tributary slot type supported by the second node, the tributary slot type with the greater tributary slot granularity in the tributary slot types supported by the two nodes is used as the tributary slot type supported by the ODU link.

Step 13: Send the determined higher order ODU link capability information to the first node; or send the second higher order ODU link capability information to the first node, so that the first node determines the higher order ODU link capability information according to the first higher order ODU link capability information and the second higher order ODU link capability information.

In this step, the second node may determine the higher order ODU link capability information, and send the higher order ODU link capability information to the first node. Alternatively, the second node directly sends the ODU link capability information supported by the second node to the first node, and the first node determines the link capability information. The negotiated higher order ODU link capability information may be used by the two nodes to respectively perform a path calculation and subsequent processing such as path establishment based on a result of the path calculation.

According to the method for negotiating link capability information in this embodiment, any node at the two ends of the higher order ODU link obtains the higher order ODU link capability information of a node at the other end, and determines the higher order ODU link capability information in combination with the higher order ODU link capability information supported by the local node. The determined result may be sent to the node at the other end, or the higher order ODU link capability information supported by the local node may only be sent to the node at the other end, so that the node at the other end determines the higher order ODU link capability information according to the same method.

According to this embodiment, automatic negotiation is performed based on the higher order ODU link capability information supported by the two nodes at the two ends of the higher order ODU link, which reduces manual operations during the process of negotiating the higher order ODU link capability information, and reduces a workload of maintenance personnel for configuring nodes of the higher order ODU link, so that efficiency of negotiating the higher order ODU link capability information is improved.

Figure 2:
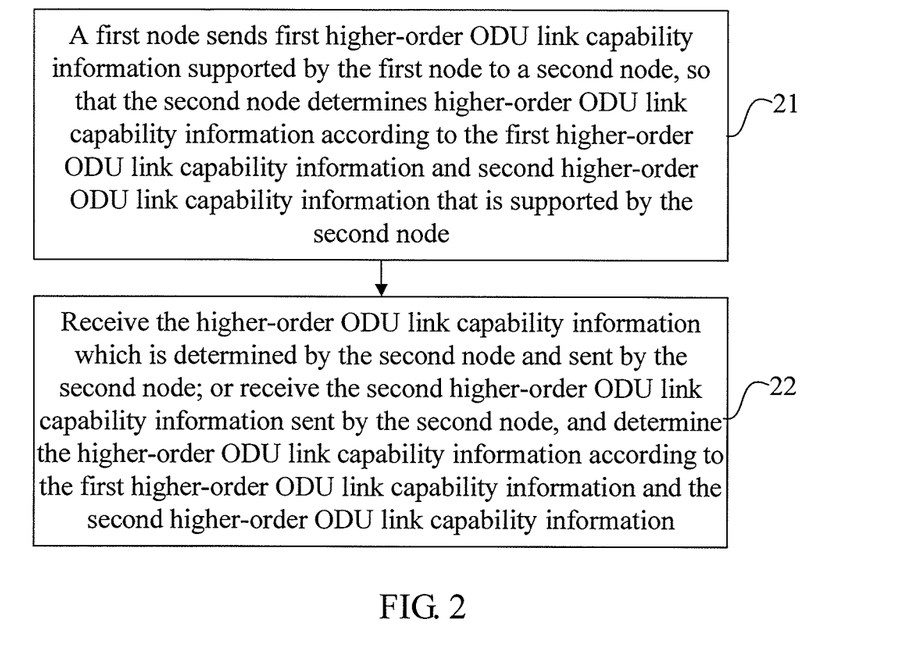
FIG. 2 is a schematic flowchart of a method for negotiating link capability information according to a second embodiment of the present invention.

FIG. 2 is a schematic flowchart of a method for negotiating link capability information according to a second embodiment of the present invention. An application scenario of this embodiment is similar to the application scenario of the embodiment corresponding to FIG. 1. A difference is that a first node is used as an executing subject for description in this embodiment. As shown in FIG. 2, the method for negotiating link capability information according to this embodiment includes:

Step 21: A first node sends first higher order ODU link capability information supported by the first node to a second node, so that the second node determines higher order ODU link capability information according to the first higher order ODU link capability information and second higher order ODU link capability information that is supported by the second node.

Higher order ODU link capability information supported by any node may include: information such as a lower order ODU type and a tributary slot type which are supported by the node when multiplexing is performed. The first node sends the higher order ODU link capability information supported by the first node to the second node, so that the second node determines the higher order ODU link capability information by integrating actual higher order ODU link capability supported by the two nodes.

Step 22: Receive the higher order ODU link capability information which is determined by the second node and sent by the second node; or receive the second higher order ODU link capability information sent by the second node, and determine the higher order ODU link capability information according to the first higher order ODU link capability information supported by the first node and the second higher order ODU link capability information.

In this step, the first node may directly obtain the higher order ODU link capability information determined by the second node; or the first may obtain the higher order ODU link capability information supported by the second node, and determine the higher order ODU link capability information by using the same method. The negotiated higher order ODU link capability information may be used by the two nodes to respectively perform a path calculation and subsequent processing such as path establishment based on a result of the path calculation.

According to this embodiment, automatic negotiation is performed based on the higher order ODU link capability information supported by the two nodes at the two ends of the higher order ODU link, which reduces manual operations during the process of negotiating the higher order ODU link capability information, and reduces a workload of maintenance personnel for configuring nodes of the higher order ODU link, so that efficiency of negotiating the higher order ODU link capability information is improved.

Figure 3A:
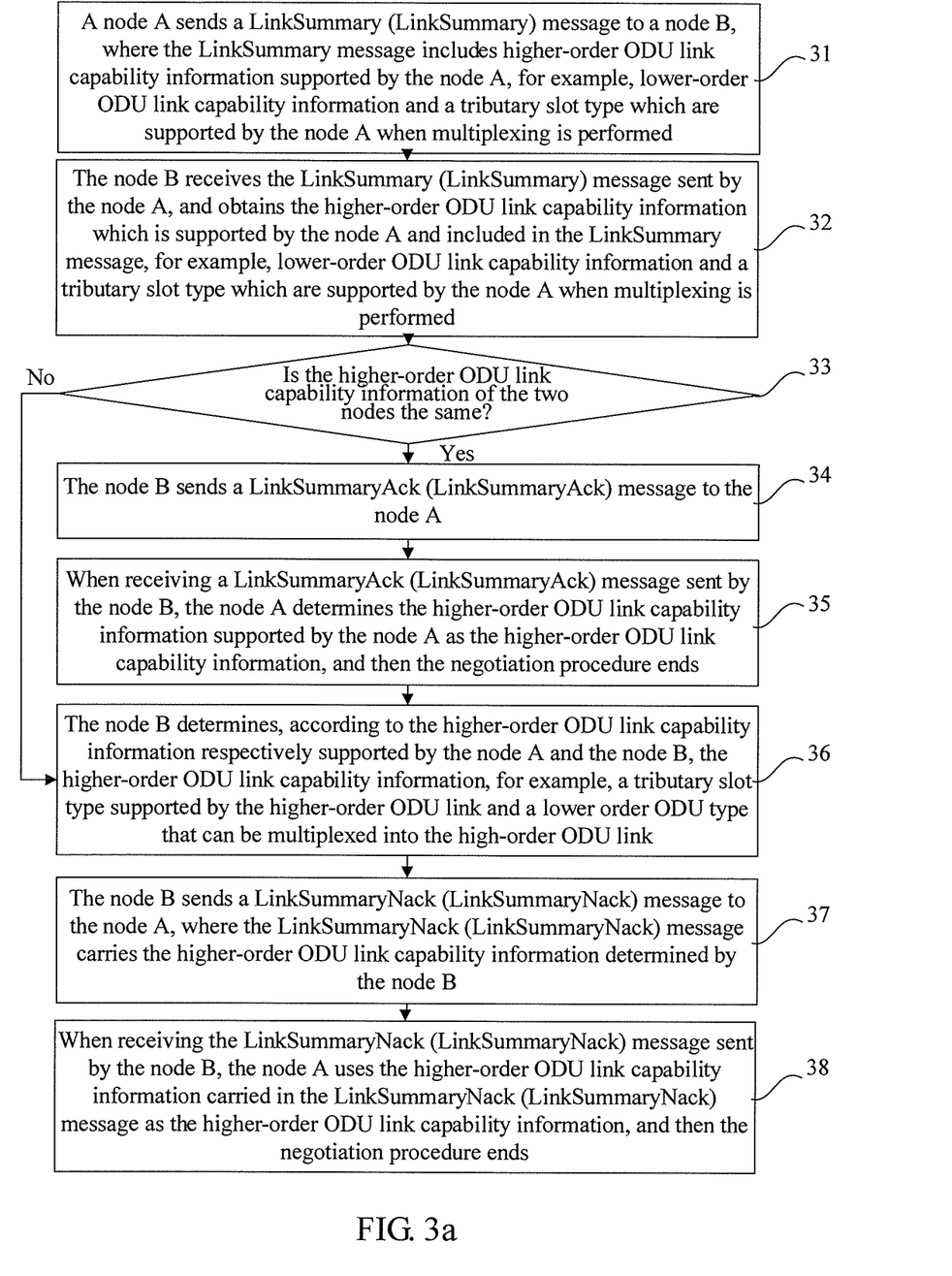
FIG. 3a is a schematic flowchart of a method for negotiating link capability information according to a third embodiment of the present invention.

FIG. 3a is a schematic flowchart of a method for negotiating link capability information according to a third embodiment of the present invention. An application scenario of this embodiment is that: After a higher order ODU link is established between any two nodes on an OTN, for example, a node A and a node B, the node A and the node B follow a link management protocol (Link Management Protocol, referred to as an LMP), and negotiate higher order ODU link capability. As shown in FIG. 3a, the method for negotiating link capability information according to this embodiment includes:

Step 31: A node A sends a LinkSummary (LinkSummary) message to a node B, where the LinkSummary message includes higher order ODU link capability information supported by the node A, for example, lower order ODU link capability information and a tributary slot type which are supported by the node A when multiplexing is performed.

The link management protocol is apart of a Generalized Multiple Protocol Label Switching (Generalized Multiple Protocol Label Switching, referred to as GMPLS) protocol cluster defined by the Internet Engineering Task Force (The Internet Engineering Task Force, referred to as the IETF), and is used to manage a link between adjacent nodes. When a local node transmits signaling with its adjacent node by following the LMP, a connection relationship between the local node and its adjacent node may be automatically discovered, and the link capability information can be negotiated, thus providing necessary information for calculating and establishing a path that satisfies a signal transmission requirement. The LinkSummary (LinkSummary) message is a message defined in the LMP, a message format of the LinkSummary message is as follows:

```
<LinkSummary Message> ::= <Common Header> <MESSAGE_ID>
<TE_LINK>
    <DATA_LINK> [<DATA_LINK> ... ]
```

Figure 3B:
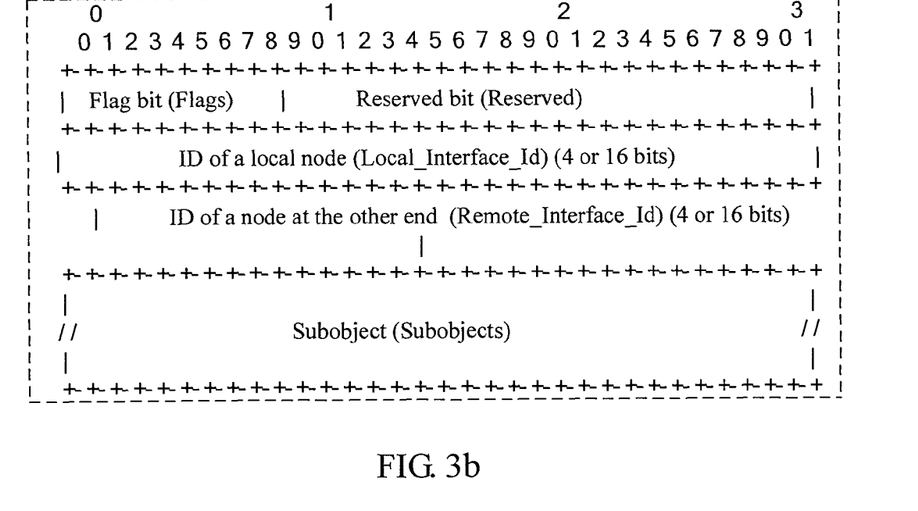
FIG. 3b is a schematic diagram of a format of the "DATA_LINK" object in an application scenario according to an embodiment of the present invention.
Figure 3C:
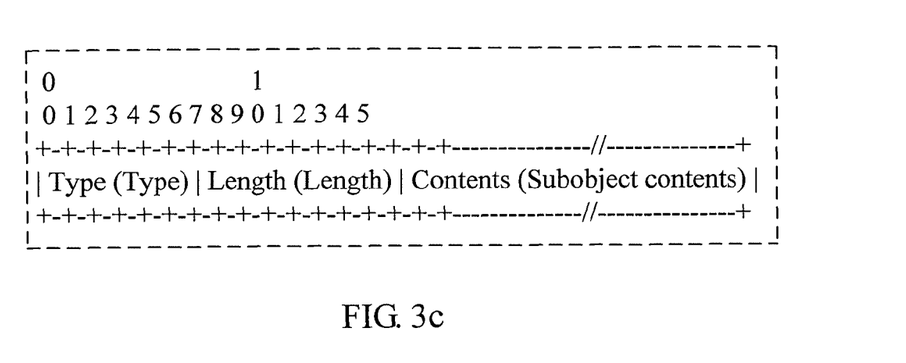
FIG. 3c is a schematic diagram of a universal format of the "Subobjects" subobject in an application scenario according to an embodiment of the present invention.

The "Common Header" is a common header of the message. The "MESSAGE_ID" is the ID of the message. The "TE_LINK" object includes the ID of the higher order ODU link. The "DATA_LINK" is used to indicate a data link object. One LinkSummary (LinkSummary) message may include one or multiple DATA_LINK objects. FIG. 3b is a schematic diagram of a format of the "DATA_LINK" object in an application scenario according to an embodiment of the present invention. The "Flag" is a flag bit. The "Reserved" is a reserved bit. The "Local_Interface_Id" and "Remote_Interface_Id" are respectively used to identify an ID of a local node of the higher order ODU link and an ID of a node at the other end of the higher order ODU link. Each "DATA_LINK" object may include one or multiple subobjects "Subobjects". FIG. 3c is a schematic diagram of a universal format of the "Subobjects" subobjects in an application scenario according to an embodiment of the present invention. The "Type" indicates the type of the subobject. The "Length" indicates the length of the subobject. Another part is the contents of the subobject (Subobject Contents).

In step 31 according to this embodiment, the higher order ODU link capability information supported by the node A may be carried in a subobject (Subobject) of the "DATA_LINK" object in the LinkSummary (LinkSummary) message and sent to the node B. For example, a new subobject may be defined, and used to describe the higher order ODU link capability information supported by the node A. In this embodiment, the new object is called a higher order ODU link capability subobject (HO ODU Link Capability Subobject).

Figure 3D:
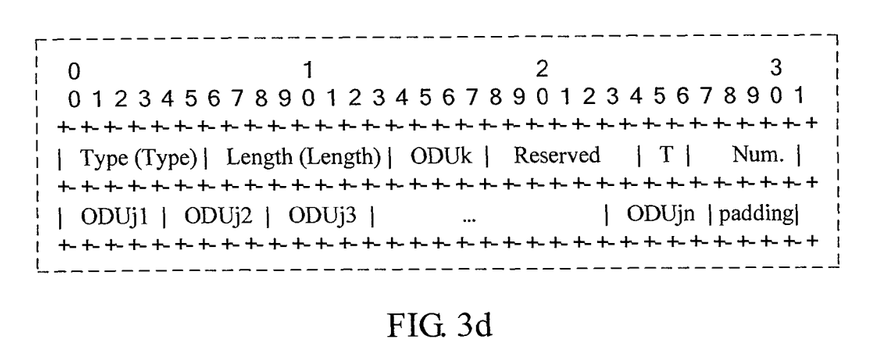
FIG. 3d is a first schematic diagram of a format of a higher order ODU link capability subobject in an application scenario according to an embodiment of the present invention.

FIG. 3d is a first schematic diagram of a format of the higher order ODU link capability subobject in an application scenario according to an embodiment of the present invention. The "Type" indicates the type of the subobject. The "Length" indicates the length of the subobject. In the part of the contents of the subobject (Subobject Contents), the "ODUk" indicates the type of a higher order ODU of the higher order ODU link; The "Reserved" field is reserved for extension use. The "T" indicates the tributary slot type supported by the local node. The "NUM." indicates the total number of lower order ODUjs that can be multiplexed into a higher order ODUk. The n fields such as "ODUj1, ODUj2 ... ODUjn" are used to list each type of a lower order ODUj that can be multiplexed into the higher order ODUk, where n is equal to the "NUM.". The "padding" part is a padding area without practical meaning, which may be filled with 0. The "ODUk" in FIG. 3d is an optional field.

In actual applications, meanings represented by each value of the ODUk, T, and ODUj may be pre-determined. For example, in the "T" field, if T=0, it indicates that the local node supports a tributary slot type with granularity 2.5 Gbit/s; if T=1, it indicates that the local node supports a tributary slot type with granularity 1.25 Gbit/s.

A mapping relationship between the value of the "ODUk" field and the type of the higher order ODU is as shown in Table 1.

TABLE 1

Mapping relationship between the value of the "ODUk" field and the type of the higher order ODU

| ODUk Value | ODU Type |
| --- | --- |
| 1 | ODU1 |
| 2 | ODU2 |
| 3 | ODU3 |
| 4 | ODU4 |
| 5 | ODU3e1 |
| 6 | ODU3e2 |
| Other | Reserved for further extension |

A mapping relationship between the value of the "ODUj" field and the type of the lower order ODU is as shown in Table 2.

TABLE 2

Mapping relationship between the value of the "ODUj" field and the type of the lower order ODU

| ODUj Value | ODU Link Type |
|---|---|
| 0 | ODU0 |
| 1 | ODU1 |
| 2 | ODU2 |
| 3 | ODU3 |
| 4 | ODU2e |
| 5 | ODUflex |
| Other | Reserved for further extension |

Figure 3E:
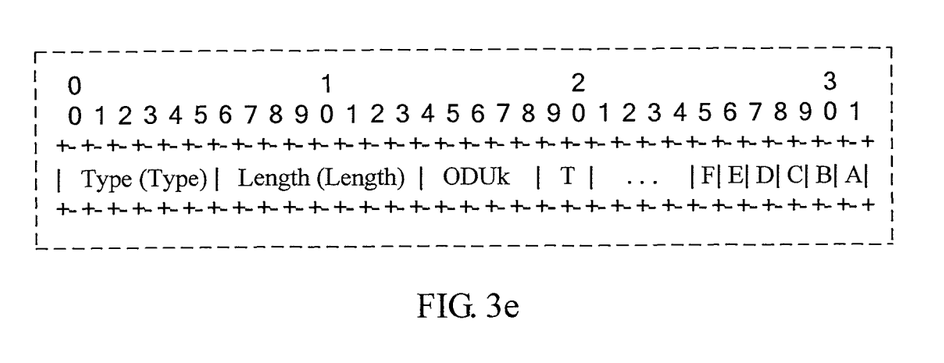
FIG. 3e is a second schematic diagram of a format of the higher order ODU link capability subobject in an application scenario according to an embodiment of the present invention.

According to the foregoing technical solution, in the higher order ODU link capability subobject (HO ODU Link Capability Subobject), besides using the listing manner to indicate the lower order ODU type which is supported by the node when multiplexing is performed, the lower order ODU type which is supported by the node when multiplexing is performed may also be indicated by using a bitmap manner. FIG. 3e is a second schematic diagram of a format of the higher order ODU link capability subobject in an application scenario according to an embodiment of the present invention. Fields such as " . . . |F|E|D|C|B|A|" carry each bit of the bitmap, where each bit of the bitmap indicates a lower order ODU type. The value of the bit indicates whether the higher order ODU link of the node supports multiplexing of the ODU type. A mapping relationship between each bit of the bitmap and the lower order ODU type is as shown in Table 3.

TABLE 3

Mapping relationship between each bit of the bitmap and the lower order ODU type

| Bit | ODU Type | Description |
|---|---|---|
| A | ODU0 | A = 1 indicates that an ODU0 is supported; A = 0 indicates that the ODU0 is not supported. |
| B | ODU1 | B = 1 indicates that an ODU1 is supported; B = 0 indicates that the ODU1 is not supported. |
| C | ODU2 | C = 1 indicates that an ODU2 is supported; C = 0 indicates that the ODU2 is not supported. |
| D | ODU3 | D = 1 indicates that an ODU3 is supported; D = 0 indicates that the ODU3 is not supported. |
| E | ODU2e | E = 1 indicates that an ODU2e is supported; E = 0 indicates that the ODU2e is not supported. |
| F | ODUflex | F = 1 indicates that an ODUflex is supported; F = 0 indicates that the ODUflex is not supported. |

In the foregoing technical solution, a multiplexing relationship, which is between the higher order ODU corresponding to the "ODUk" field and the lower order ODU corresponding to the "ODUj", and the supported tributary slot type are determined by an OTN standard version that the node complies with and device capability of the node. The multiplexing relationship between the higher order ODU and lower order ODU in an old OTN standard (ITU-T G.709 Amendment1).

TABLE 4

Multiplexing relationship between the higher order ODU and lower order ODU in the old OTN standard

| Lower Order ODU | Higher Order ODU | Tributary Slot Type | Description |
|---|---|---|---|
| ODU1 | ODU2 | 2.5 Gbit/s | The ODU1 occupies 1 of the 4 tributary slots of the ODU2. |
| ODU1 | ODU3 | 2.5 Gbit/s | The ODU1 occupies 1 of the 16 tributary slots of the ODU3. |
| ODU2 | ODU3 | 2.5 Gbit/s | The ODU1 occupies 4 of the 16 tributary slots of the ODU3. |

A multiplexing relationship between the higher order ODU and lower order ODU in a new OTN standard (ITU-T G.709 Amendment3 and G. Sup43) is as shown in Table 5.

TABLE 5

Multiplexing relationship between the higher order ODU and lower order ODU in the new OTN standard

| Lower Order ODU | Higher Order ODU | Tributary Slot Type | Description |
|---|---|---|---|
| ODU0 | ODU1/ODU2/ DOU3/ODU4 | 1.25 Gbit/s | The ODU0 occupies 1 of the 2/8/32/80 tributary slots of the ODU1/ODU2/DOU3/ODU4. |
| ODU1 | ODU2/ODU3/ ODU4 | 1.25 Gbit/s | The ODU1 occupies 2 of the 8/32/80 tributary slots of the ODU2/DOU3/ODU4. |
| ODU2 | ODU3/ODU4 | 1.25 Gbit/s | The ODU2 occupies 8 of the 32/80 tributary slots of the ODU3/ODU4. |
| ODU3 | ODU4 | 1.25 Gbit/s | The ODU3 occupies 32 of the 80 tributary slots of the ODU4. |
| ODUflex | ODU1/ODU2/ DOU3/ODU4 | 1.25 Gbit/s | The ODUflex occupies n of the 2/8/32/80 tributary slots of the ODU1/ODU2/DOU3/ODU4, where n ≤ the total number of tributary slots of the ODUk. |
| ODU2e | ODU3/ODU4/ ODU3e2 | 1.25 Gbit/s | The ODU2e occupies 9/9/8 of the 32/80/32 tributary slots of the ODU3/DOU4/ODU3e2. |
| ODU2e | ODU3e1 | 2.5 Gbit/s | The ODU2e occupies 8 of the 32 tributary slots of the ODU3e2. |

Among each ODU signal type defined in the new OTN standard, the ODU0, ODU2e, and ODUflex are not used as the higher order ODU, and the ODU4, ODU3e1, and ODU3e2 are not used as the lower order ODU.

Step 32: The node B receives the LinkSummary (LinkSummary) message sent by the node A, and obtains the higher order ODU link capability information which is supported by the node A and included in the Link Summary message, for example, lower order ODU link capability information and a tributary slot type which are supported by the node A when multiplexing is performed.

The node B may obtain a tributary slot type supported by the node A from the "T" field in the higher order ODU link capability subobject (HO ODU Link Capability Subobject) included in the LinkSummary message, and may obtain an intersection of the lower order ODU types supported by the node A from n fields such as "ODUj1, ODUj2 . . . ODUjn".

Step 33: The node B judges whether the higher order ODU link capability information supported by the node B is the same as the higher order ODU link capability information supported by the node A. If the higher order ODU link capability information supported by the node B is the same as the higher order ODU link capability information supported by the node A, step 34 is executed; if the higher order ODU link capability information supported by the node B is not the same as the higher order ODU link capability information supported by the node A, step 36 is executed.

Step 34: The node B sends a LinkSummaryAck (LinkSummaryAck) message to the node A.

A message format of the LinkSummaryAck (LinkSummaryAck) message is exemplarily as follows:

<LinkSummaryAck Message>::=<Common Header> <MESSAGE_ID_ACK>

The "Common Header" indicates a common header of the message, and the "MESSAGE_ID_ACK" indicates the ID of the LinkSummaryAck message.

Step 35: When receiving the LinkSummaryAck (LinkSummaryAck) message sent by the node B, the node A determines the higher order ODU link capability information supported by the node A as the higher order ODU link capability information, and then the negotiation procedure ends.

Step 36: The node B determines, according to the higher order ODU link capability information respectively supported by the node A and the node B, the higher order ODU link capability information, for example, a tributary slot type supported by the higher order ODU link and a lower order ODU type that can be multiplexed into the higher order ODU link.

The node B compares the tributary slot type supported by the node B with the tributary slot type supported by the node A. If the two nodes support a tributary slot type with smaller tributary slot granularity, for example, support a tributary slot type with granularity 1.25 Gbit/s, the tributary slot type with the smaller granularity (1.25 Gbit/s) is determined as the tributary slot type supported by the higher order ODU link; otherwise, the tributary slot type with bigger granularity, for example, the tributary slot type with granularity 2.5 Gbit/s, is determined as the tributary slot type supported by the higher order ODU link.

The node B performs an intersection operation on a set of the lower order ODU types that can be multiplexed into the higher order ODU of the node B and a set of the lower order ODU types that can be multiplexed into the higher order ODU of the node A, where an obtained intersection is lower order ODU types that can be multiplexed into the higher order ODU link.

Step 37: The node B sends a LinkSummaryNack (LinkSummaryNack) message to the node A, where the LinkSummaryNack (LinkSummaryNack) message carries the higher order ODU link capability information determined by the node B.

A format of the LinkSummaryNack (LinkSummaryNack) message is exemplarily as follows:

<LinkSummaryNack Message>::=<Common Header> <MESSAGE_ID_NACK> <ERROR_CODE> [<DATA_LINK> . . . ]

The "Common Header" indicates a common header of the message, and the "MESSAGE_ID_ACK" indicates the ID of the LinkSummaryNack message. The "DATA_LINK" is used to indicate a data connection object, and carries the higher order ODU link capability information determined by the node B, or carries the higher order ODU link capability information supported by the node B, which may be carried in the newly-added higher order ODU link capability subobject (HO ODU Link Capability Subobject) in the "DATA_LINK". The "ERROR_CODE" object is used to indicate the cause of returning the LinkSummaryNack message. A value of the "ERROR_CODE" may be added in this embodiment, and is used to indicate that the cause of returning the "LinkSummaryNack" message is that the capability information of the nodes at the two ends of the higher order ODU link is inconsistent.

Step 38: When receiving the LinkSummaryNack (LinkSummaryNack) message sent by the node B, the node A determines the higher order ODU link capability information carried in the LinkSummaryNack (LinkSummaryNack) message as the higher order ODU link capability information, and then the negotiation procedure ends.

In the foregoing technical solution, the node B in step 37 may send the higher order ODU link capability information supported by the node B to the node A (not shown in the figure) in the LinkSummaryNack (LinkSummaryNack) message. In this case, in step 38, when receiving the LinkSummaryNack (LinkSummaryNack) message, the node A obtains the higher order ODU link capability information supported by the node B from the LinkSummaryNack (LinkSummaryNack) message, and determines the higher order ODU link capability information by using the same method that the node B uses to determine the higher order ODU link capability information. Reference may be made to the description in step 36 for the specific method for determining the higher order ODU link capability information by the node A, which is not repeatedly described here.

In the foregoing technical solution, related information about the higher order ODU link capability between the node A and the node B may be carried in a message complying with the link management protocol, for example, messages such as the LinkSummary (LinkSummary), LinkSummaryAck (LinkSummaryAck), or Link SummaryNack (Link SummaryNack), and may be transmitted by using control plane resources. Specifically, these messages may be transmitted by using inband resources of a control plane. For example, a two-byte general communication channel 1 (General Communication Channel 1, referred to as a GCC1) and a two-byte general communication channel 2 (General Communication Channel 2, referred to as a GCC2), which are in an ODU overhead of an optical channel transport unit (Optical Channel Transport Unit, referred to as an OTU) frame, may be used as a data communication network (Data Communication Network, referred to as a DCN) channel for transmission. Or, these messages may be transmitted by using outband resources of the control plane. For example, an outband data communication network can be used for transmission.

The following describes the technical solution of the method for negotiating link capability information according to this embodiment through a specific application example.

Assumed that one higher order ODU link has been set up between a node A and a node B, the type of the higher order ODU link is an ODU3. Higher order ODU link capability information supported by the node A is that: A supported tributary slot type is 1.25 Gbit/s, and a supported lower order ODU type when multiplexing is performed includes an ODUflex, an ODU0, an ODU1, and an ODU2. Higher order ODU link capability information supported by the node B is that: A supported tributary slot type is 2.5 Gbit/s, and a supported lower order ODU type when multiplexing is performed includes the ODU1 and the ODU2. The node A and the node B use the method for negotiating link capability information according to this embodiment for negotiation, where the method specifically includes:

1. A node A sends a LinkSummary (LinkSummary) message to a node B, where the message includes a higher order ODU link capability information (HO ODU Link Capability Subobject) subobject.

Figure 3F:
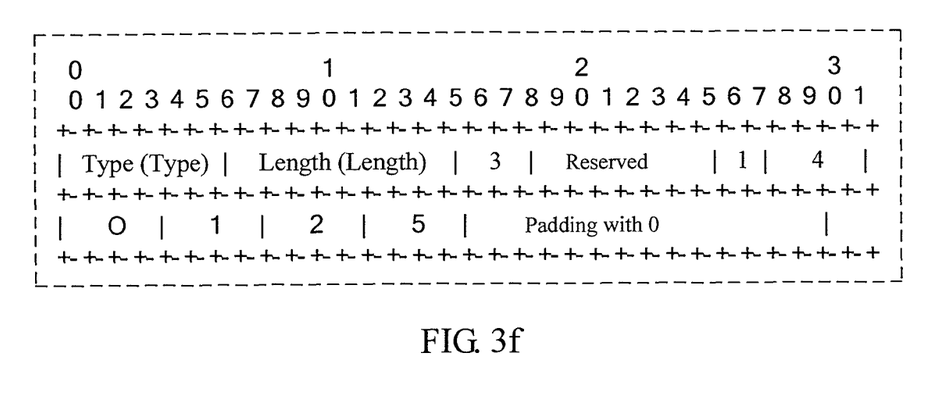
FIG. 3f is a schematic diagram of a format of the higher order ODU link capability subobject in a LinkSummary message according to an embodiment of the present invention.

FIG. 3f is a schematic diagram of a format of the higher order ODU link capability information subobject in a Link- Summary message according to an embodiment of the present invention. Referring to FIG. 3d and FIG. 3f, in the higher order ODU link capability information (HO ODU Link Capability Subobject) subobject, a value of an "ODUk" field is 3, which indicates that the type of the higher order ODU link is an ODU3; a value of a "T" field is 1, which indicates that a tributary slot type supported by the node A is 1.25 Gbit/s; a value of a "Num." field is 4, which indicates that the node A supports multiplexing of four ODU types. Values of the "ODUj1", "ODUj2", "ODUj3", and "ODUj4" fields are respectively 0, 1, 2, and 5, which indicates that four ODU types which are supported by the node A when multiplexing is performed are an ODU0, an ODU1, an ODU2, and an ODUflex.

2. The node B determines, according to the higher order ODU link capability information respectively supported by the node A and the node B, the ODU link capability information, where the ODU link capability information includes a tributary slot type supported by the ODU link and a lower order ODU type which is supported by the ODU link when multiplexing is performed.

The tributary slot type supported by the node B is 2.5 Gbit/s but not 1.25 Gbit/s. Therefore, the node B determines that the tributary slot type supported by the ODU link is 2.5 Gbit/s.

A lower order ODU type set which is supported by the node B when multiplexing is performed is {ODU1, ODU2}, a lower order ODU type set which is supported by the node A when multiplexing is performed is {ODU0, ODU1, ODU2, ODUflex}. Therefore, the node B determines an intersection of these two sets as lower order ODU types which are supported by the ODU link when multiplexing is performed.

3. The node B carries the determined information in a LinkSummaryNack (LinkSummaryNack) message and sends the message to the node A.

Figure 3G:
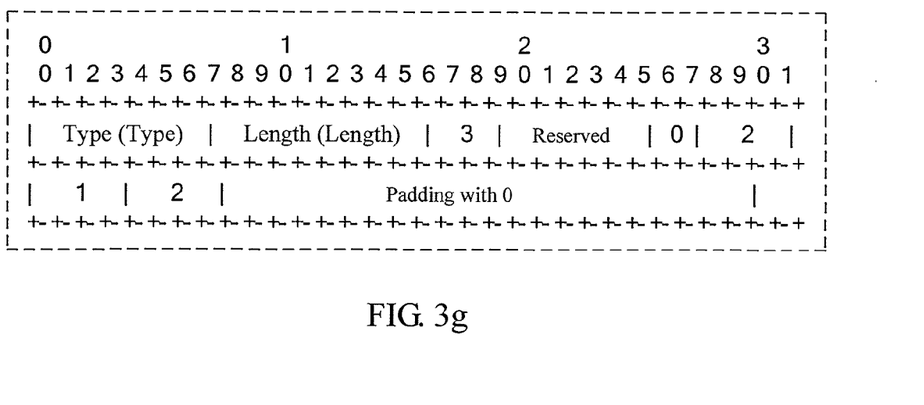
FIG. 3g is a schematic diagram of a format of the higher order ODU link capability subobject in a LinkSummaryNack message according to an embodiment of the present invention.

FIG. 3g is a schematic diagram of a format of the higher order ODU link capability information subobject in a LinkSummaryNack message according to an embodiment of the present invention. Referring to FIG. 3d and FIG. 3g, in the format of the higher order ODU link capability information subobject included in the LinkSummaryNack (LinkSummaryNack) message, the value of the "T" field is 0, which indicates that the tributary slot type supported by the higher order ODU link is 2.5 Gbit/s; the value of the "Num." field is 2, which indicates that the higher order ODU link supports multiplexing of two lower order ODU types; and the values of the "ODUj1" and "ODUj2" fields are respectively 1 and 2, which indicates that the lower order ODU types that can be multiplexed into the higher order ODU link are respectively the ODU1 and the ODU2.

4. The node A obtains the higher order ODU link capability information according to the higher order ODU link capability information (HO ODU Link Capability Subobject) subobject in the LinkSummaryNack (LinkSummaryNack) message.

It can be seen from the foregoing technical solution and description of the embodiment that: In the method for negotiating link capability information according to this embodiment, any node at the two ends of the higher order ODU link obtains the higher order ODU link capability information of the node at the other end, where the higher order ODU link capability information includes the tributary slot type supported by the node at the other end and the lower order ODU signal type supported by the node at the other end, and determines the higher order ODU link capability in combination with the higher order ODU link capability information supported by the local node, that is, determines the tributary slot type and the lower order ODU signal type that are supported by the higher order ODU link. In addition, the determined result may be sent to the node at the other end, or the higher order ODU link capability information supported by the local node may only be sent to the node at the other end, so that the node at the other end determines the higher order ODU link capability according to the same method. According to this embodiment, automatic negotiation is performed based on the higher order ODU link capability information, namely the tributary slot type and the lower order ODU signal type, supported by the two nodes at the two ends of the higher order ODU link, which reduces manual operations during the process of negotiating the higher order ODU link capability information, and reduces a workload of maintenance personnel for configuring nodes of the higher order ODU link, so that efficiency of negotiating the higher order ODU link capability information is improved.

Further, in the method for negotiating link capability information according to this embodiment, the two nodes at the two ends of the higher order ODU link comply with an LMP protocol on a control plane. The control plane may carry more link capability information, and therefore, during the process of negotiating the link capability information in the embodiment, distinguishing granularity of the higher order ODU link capability needed to be negotiated is refined. This embodiment not only can be applied to the scenario where the higher order ODU link capability is negotiated between two nodes that support different OTN standards, but also can be used in the scenario where the link capability is negotiated between two nodes that have different higher order ODU link capability but support the same OTN standard, for example, in an application scenario where a node only supports a tributary slot type with tributary slot granularity 1.25 Gbit/s, but does not support signal types defined in a new standard such as the ODU0, the ODU4, the ODU2e, the ODU3e1, the ODU3e2, and the ODUflex; or only supports one or multiple of the signal types defined in the foregoing new standard. Therefore, this embodiment has wide applicability, and the higher order ODU link capability information supported by the node at the other end in practice can be correctly obtained, which improves the efficiency and accuracy of negotiating the higher order ODU link capability information. The negotiated higher order ODU link capability information provides necessary information for calculating and establishing a path that satisfies a signal transmission requirement. Therefore, this embodiment is also beneficial for improving the success rate of establishing the path that satisfies the signal transmission requirement.

Figure 4:
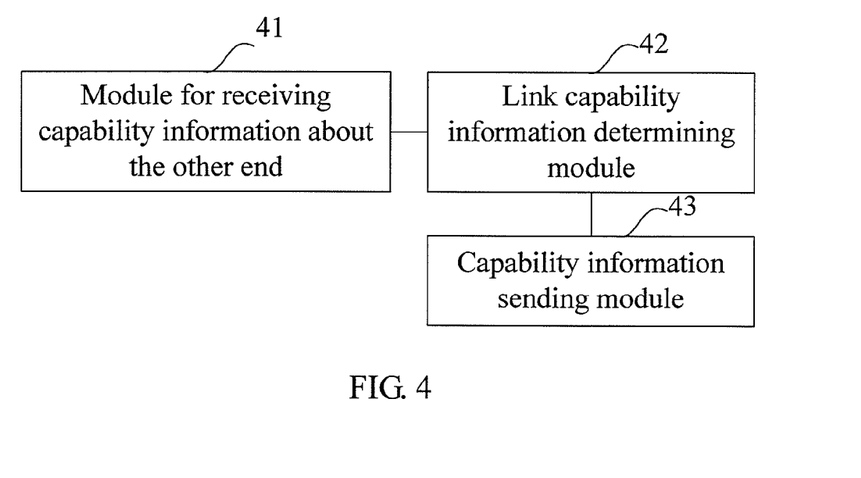
FIG. 4 is a schematic structural diagram of a network device according to a fourth embodiment of the present invention.

FIG. 4 is a schematic structural diagram of a network device according to a fourth embodiment of the present invention. As shown in FIG. 4, the network device according to the embodiment includes: a module for receiving capability information about the other end 41, a link capability information determining module 42, and a link capability information sending module 43.

The module for receiving capability information about the other end 41 is configured to, after a higher order optical channel data unit (ODU) link is established, receive first higher order ODU link capability information supported by a first node at the other end of the higher order ODU link.

The link capability information determining module 42 is configured to determine higher order ODU link capability information according to second higher order ODU link capability information supported by the link capability information determining module the and the first higher order ODU link capability information supported by the first node.

The link capability information sending module 43 is configured to send the higher order ODU link capability information determined by the link capability information determining module 42 to the first node; or send the second higher order ODU link capability information supported by the link capability information sending module 43 to the first node, so that the first node determines the higher order ODU link capability information according to the first higher order ODU link capability information and the second higher order ODU link capability information.

In the foregoing technical solution, the first higher order ODU link capability information may include: a first lower order ODU type and a first tributary slot type which are supported by the first node when multiplexing is performed; the second higher order ODU link capability information may include: a second lower order ODU type and a second tributary slot type which are supported by the network device when multiplexing is performed; and the higher order link capability information includes: a lower order ODU type that can be multiplexed into the higher order ODU link and a tributary slot type supported by the higher order ODU link. Correspondingly, the link capability information determining module 42 is further configured to determine an intersection of the first lower order ODU type and the second lower order ODU type as a lower order ODU type that can be multiplexed into the higher order ODU link; and determine, when tributary slot granularity of the first tributary slot type is equal to tributary slot granularity of the second tributary slot type, any of the first tributary slot type and the second tributary slot type as a tributary slot type supported by the higher order ODU link, or when tributary slot granularity of the first tributary slot type is not equal to tributary slot granularity of the second tributary slot type, a tributary slot type with greater tributary slot granularity as a tributary slot type supported by the higher order ODU link.

Based on the foregoing technical solution, according to this embodiment, negotiation information of the link capability information between the network device and the second node at the other end of the link can be transmitted by following a link management protocol. Specifically, the module for receiving capability information about the other end 41 may be further configured to receive the first higher order ODU link capability information by following the link management protocol; and the link capability information sending module 43 may be further configured to send the determined higher order ODU link capability information and the second higher order ODU link capability information by following the link management protocol.

In the network device and another node at the other end of the higher order ODU link according to this embodiment, automatic negotiation is performed based on the higher order ODU link capability information supported by the two nodes, which reduces manual operations during the process of negotiating the higher order ODU link capability information, and reduces a workload of maintenance personnel for configuring nodes of the higher order ODU link, so that efficiency of negotiating the higher order ODU link capability information is improved.

A specific implementation entity of the network device according to this embodiment is not limited. Reference may be made to the description of the embodiments corresponding to FIG. 1 and FIG. 3*a* for working principles of the network device, which are not repeatedly described here.

Figure 5:
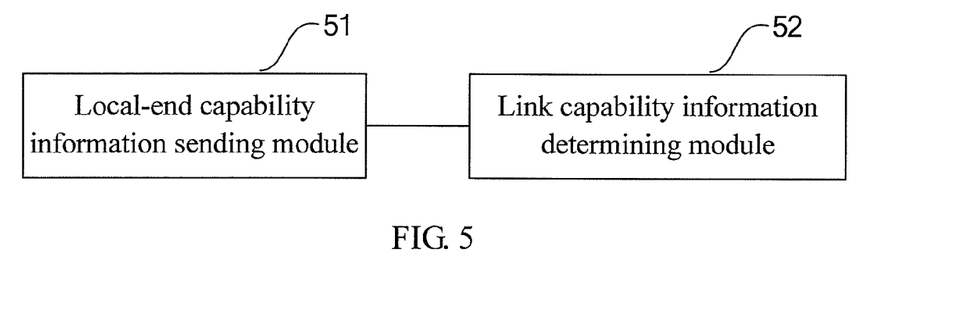
FIG. 5 is a schematic structural diagram of a network device according to a fifth embodiment of the present invention.

FIG. 5 is a schematic structural diagram of a network device according to a fifth embodiment of the present invention. As shown in FIG. 5, the network device according to this embodiment includes: a local-end capability information sending module 51 and a link capability information determining module 52.

The local-end capability information sending module 51 is configured to first higher order ODU link capability information supported by the local-end capability information sending module to a second node at the other end of a higher order ODU link, so that the second node determines higher order ODU link capability information according to the first higher order ODU link capability information and second higher order ODU link capability information that is supported by the second node.

The link capability information determining module 52 is configured to receive the higher order ODU link capability information sent by the second node; or receive the second higher order ODU link capability information sent by the second node, and determine the higher order ODU link capability information according to the first higher order ODU link capability information and the second higher order ODU link capability information.

In the foregoing technical solution, the first higher order ODU link capability information includes: a first lower order ODU type and a first tributary slot type which are supported by the network device when multiplexing is performed; the second higher order ODU link capability information includes: a second lower order ODU type and a second tributary slot type which are supported by the second node when multiplexing is performed; and the higher order ODU link capability information includes: a lower order ODU type that can be multiplexed into the higher order ODU link and a tributary slot type supported by the higher order ODU link. Correspondingly, the link capability information determining module 52 may be further configured to determine an intersection of the first lower order ODU type and the second lower order ODU type as a lower order ODU type that can be multiplexed into the higher order ODU link; and determine, when tributary slot granularity of the first tributary slot type is equal to tributary slot granularity of the second tributary slot type, any of the first tributary slot type and the second tributary slot type as a tributary slot type supported by the higher order ODU link, or when tributary slot granularity of the first tributary slot type is not equal to tributary slot granularity of the second tributary slot type, a tributary slot type with greater tributary slot granularity as a tributary slot type supported by the higher order ODU link.

Based on the foregoing technical solution, according to this embodiment, negotiation information of the link capability information between the network device and the second node at the other end of the higher order ODU link can be transmitted by following a link management protocol. Specifically, the local-end capability information sending module 51 may be further configured to send the first higher order ODU link capability information by following the link management protocol; and the link capability information determining module 52 may be further configured to receive the higher order ODU link capability information and the second higher order ODU link capability information by following the link management protocol.

In the network device and another node at the other end of the higher order ODU link according to this embodiment, automatic negotiation is performed based on the higher order ODU link capability information supported by the two nodes, which reduces manual operations during the process of negotiating the higher order ODU link capability information, and reduces a workload of maintenance personnel for configuring nodes of the higher order ODU link, so that efficiency of negotiating the higher order ODU link capability information is improved.

A specific implementation entity of the network device according to this embodiment is not limited. Reference may be made to the description of the embodiments corresponding to FIG. 1 and FIG. 3a for working principles of the network device, which are not repeatedly described here.

Figure 6:
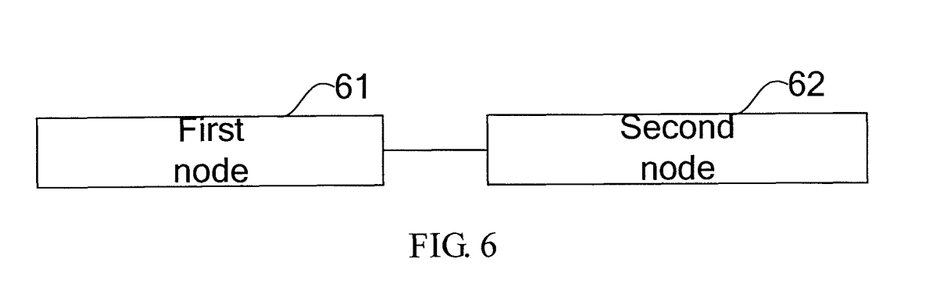
FIG. 6 is a schematic structural diagram of a communication system according to a sixth embodiment of the present invention.

FIG. 6 is a schematic structural diagram of a communication system according to a sixth embodiment of the present invention. As shown in FIG. 6, the communication system according to this embodiment includes: a higher order ODU link, and a first node 61 and a second node 62 that are located at the two ends of the higher order ODU link.

The first node 61 is configured to send first higher order ODU link capability information supported by the first node 61 to the second node 62; receive higher order ODU link capability information which is determined by the second node 62 and sent by the second node 62.

The second node 62 is configured to determine ODU link capability information according to second higher order ODU link capability information supported by the second node 62 and the first higher order ODU link capability information supported by the first node 61; and send the ODU link capability information to the first node 61.

Alternatively, the first node 61 is configured to send first higher order ODU link capability information supported by the first node 61 to the second node 62; receive second higher order ODU link capability information supported by the second node 62; and determine ODU link capability information according to the first higher order ODU link capability information and the second higher order ODU link capability information.

The second node 62 is configured to send the second higher order ODU link capability information supported by the second node 62 to the first node 61; receive the first higher order ODU link capability information supported by the first node 61; and determine the higher order ODU link capability information according to the first higher order ODU link capability information and the second higher order ODU link capability information.

In the communication system according to this embodiment, negotiation is performed based on the higher order ODU link capability information supported by the two nodes at the two ends of the higher order ODU link, which reduces manual operations during the process of negotiating the higher order ODU link capability information, and reduces a workload of maintenance personnel for configuring nodes of the higher order ODU link, so that efficiency of negotiating the higher order ODU link capability information is improved. In the communication system according to this embodiment, reference may be made to the description of the embodiment corresponding to FIG. 4 for a refined functional structure of the first node, and reference may be made to the description of the embodiments corresponding to FIG. 1 and FIG. 3 for working principles of the first node; reference may be made to the description of the embodiment corresponding to FIG. 5 for a refined functional structure of the second node, and reference may be made to the description of the embodiments corresponding to FIG. 2 and FIG. 3a for working principles of the second node, which are not repeatedly described here.

Those of ordinary skill in the art may understand that the accompanying drawings are only schematic diagrams of an embodiment, and modules and procedures involved in the accompanying drawings are not definitely required for the implementation of the present invention.

Those of ordinary skill in the art may understand that: modules in apparatuses provided in embodiments may be distributed in the apparatuses listed in the embodiments according to the description of the embodiments, or may vary and be located in one or multiple apparatuses which are different from those described in the embodiments of the present invention. The modules according to the foregoing embodiments may be combined in one module, or further split into multiple submodules.

Sequence numbers of the foregoing embodiments of the present invention are only for ease of description, but do not denote the preference of the embodiments.

Persons of ordinary skill in the art may understand that all or part of steps according to the foregoing method embodiments may be implemented by a program instructing relevant hardware. The program may be stored in a computer readable storage medium. When the program is executed, the steps of the foregoing method embodiment are executed. The storage medium includes any medium that may store program codes, such as a ROM, a RAM, a magnetic disk, or a compact disk.

Finally, it should be noted that the foregoing embodiments are only used to describe the technical solutions of the present invention, but are not intended to limit the technical solutions of the present invention. Although the present invention is described in detail with reference to the exemplary embodiments, those of ordinary skill in the art should understand that: The technical solutions recorded in the foregoing embodiments may still be modified, or part of the technical features of the technical solutions may be replaced equivalently; however, these modifications or replacements do not make the corresponding technical solutions deviate from the spirit and scope of the technical solutions according to the embodiments of the present invention.

What is claimed is:

1. A method for negotiating link capability information, wherein after a higher order optical channel data unit (ODU) link is established, the method comprising:

receiving, by a second node, first higher order ODU link capability information supported by a first node at one end of the link, where the second node is located at the other end of the link, wherein the first higher order ODU link capability information comprises: a first lower order ODU type and a first tributary slot type which are supported by the first node when multiplexing is performed;

determining, by the second node, link capability information according to the first higher order ODU link capability information and second higher order ODU link capability information that is supported by the second node, wherein the second higher order ODU link capability information comprises: a second lower order ODU type and a second tributary slot type which are supported by the second node when multiplexing is performed, the link capability information comprises: a lower order ODU type which is supported by the link when multiplexing is performed and a tributary slot type supported by the link, wherein determining the link capability information comprises:

determining an intersection of the first lower order ODU type and the second lower order ODU type as a lower order ODU type which is supported by the link when multiplexing is performed, and determining, when tributary slot granularity of the first tributary slot type is equal to tributary slot granularity of the second tributary slot type, any of the first tributary slot type and the second tributary slot type as a tributary slot type supported by the link, or when tributary slot granularity of the first tributary slot type is not equal to tributary slot granularity of the second tributary slot type, a tributary slot type with greater tributary slot granularity as a tributary slot type supported by the link; and sending, by the second node, the link capability information to the first node.

2. The method for negotiating link capability information according to claim 1, further comprising: transmitting the first higher order ODU link capability information and the link capability information by following a link management protocol.

3. A method for negotiating link capability information, wherein after a higher order optical channel data unit (ODU) link is established, the method comprising:
sending, by a first node at one end of the link, first higher order ODU link capability information supported by the first node to a second node at the other end of the link, so that the second node determines link capability information according to the first higher order ODU link capability information and second higher order ODU link capability information that is supported by the second node, wherein the first higher order ODU link capability information comprises: a first lower order ODU type and a first tributary slot type which are supported by the first node when multiplexing is performed, the second higher order ODU link capability information comprises: a second lower order ODU type and a second tributary slot type which are supported by the second node when multiplexing is performed, the link capability information comprises: a lower order ODU type which is supported by the link when multiplexing is performed and a tributary slot type supported by the link, wherein the determining link capability information comprises: determining an intersection of the first lower order ODU type and the second lower order ODU type as a lower order ODU type which is supported by the link when multiplexing is performed; determining, when tributary slot granularity of the first tributary slot type is equal to tributary slot granularity of the second tributary slot type, any of the first tributary slot type and the second tributary slot type as a tributary slot type supported by the link, or when tributary slot granularity of the first tributary slot type is not equal to tributary slot granularity of the second tributary slot type, a tributary slot type with greater tributary slot granularity as a tributary slot type supported by the link; and
receiving the link capability information sent by the second node.

4. The method for negotiating link capability information according to claim 3, further comprising: transmitting the first higher order ODU link capability information, and the link capability information by following a link management protocol.

5. A network device, comprising:
a module for receiving capability information about a first node and configured to, after a higher order optical channel data unit (ODU) link is established between the network device and the first node, receive first higher order ODU link capability information supported by the first node at one end of the link, wherein the first higher order ODU link capability information comprises: a first lower order ODU type and a first tributary slot type which are supported by the first node when multiplexing is performed;
a link capability information determining module, configured to determine link capability information according to the first higher order ODU link capability information and second higher order ODU link capability information that is supported by the link capability information determining module, wherein the second higher order ODU link capability information comprises: a second lower order ODU type and a second tributary slot type which are supported by the network device when multiplexing is performed, the link capability information comprises: a lower order ODU type which is supported by the link when multiplexing is performed and a tributary slot type supported by the link;
a capability information sending module, configured to send the link capability information to the first node, and send the second higher order ODU link capability information to the first node, so that the first node determines the link capability information according to the first higher order ODU link capability information and the second higher order ODU link capability information; and
wherein the link capability information determining module is further configured to determine an intersection of the first lower order ODU type and the second lower order ODU type as a lower order ODU type which is supported by the link when multiplexing is performed; and determine, when tributary slot granularity of the first tributary slot type is equal to tributary slot granularity of the second tributary slot type, any of the first tributary slot type and the second tributary slot type as a tributary slot type supported by the link, or when tributary slot granularity of the first tributary slot type is not equal to tributary slot granularity of the second tributary slot type, a tributary slot type with greater tributary slot granularity as a tributary slot type supported by the link.

6. The network device according to claim 5, wherein
the module for receiving capability information is further configured to receive the first higher order ODU link capability information by following a link management protocol; and
the capability information sending module is further configured to send the link capability information by following the link management protocol.

* * * * *